2,722,735

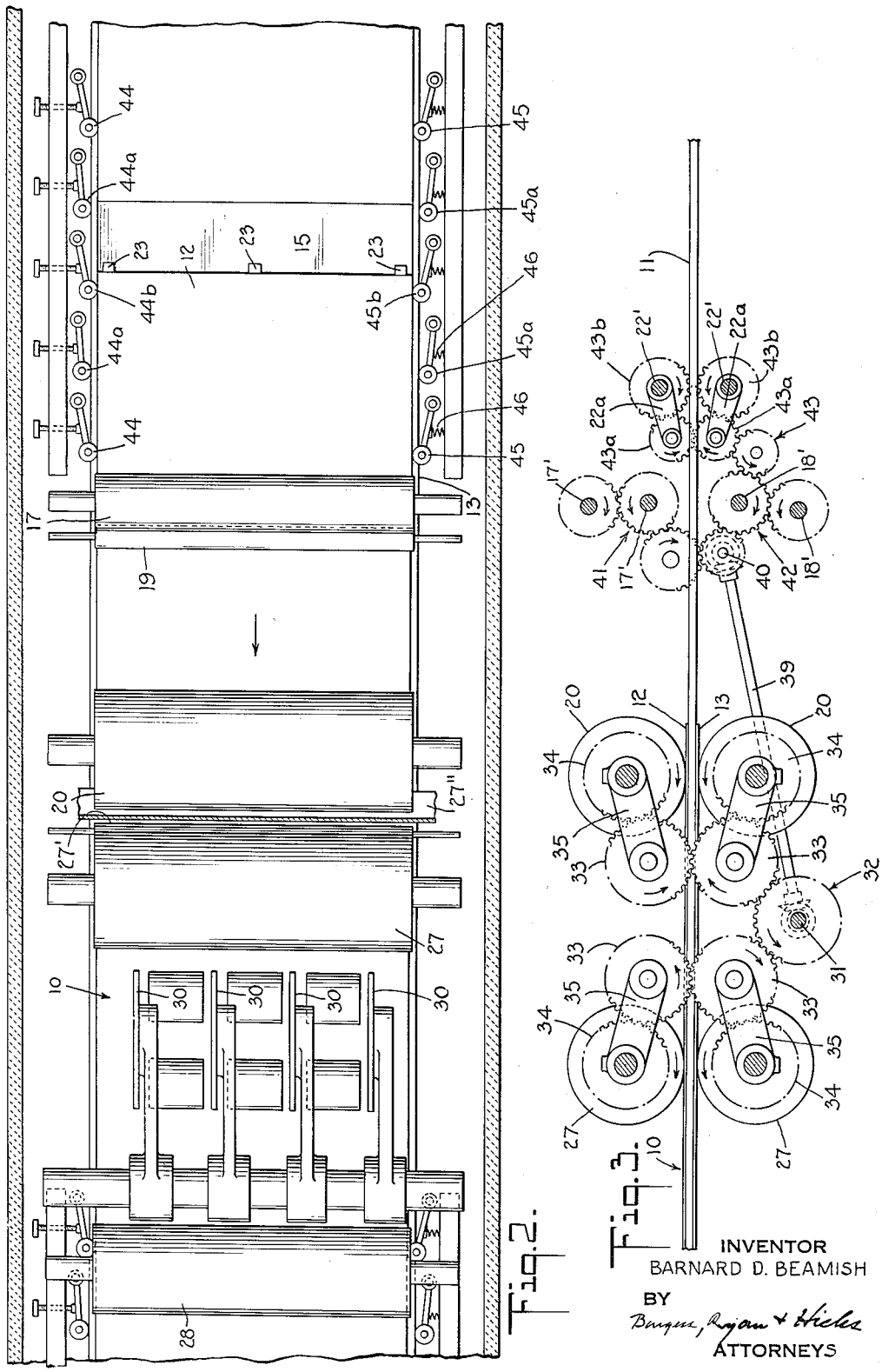

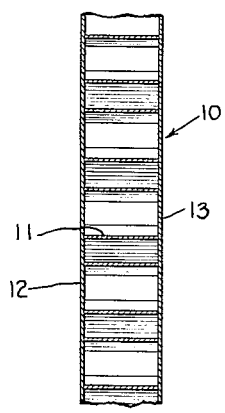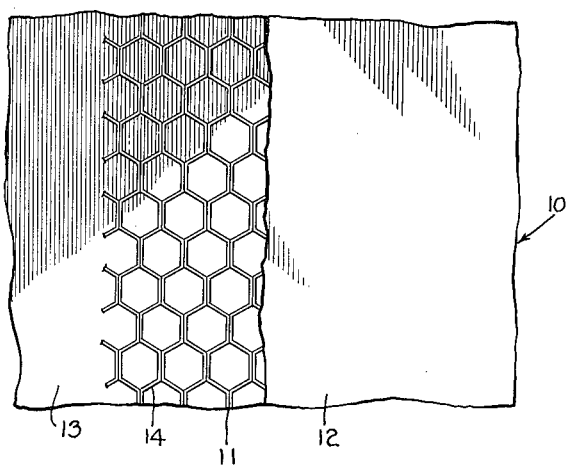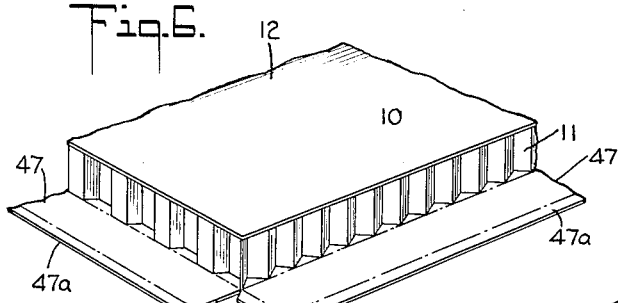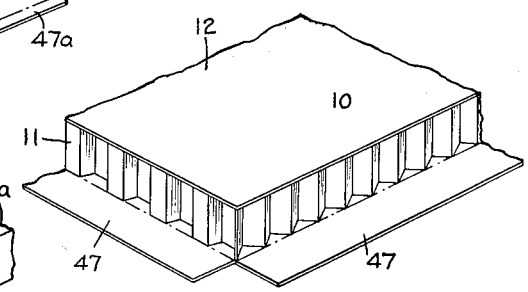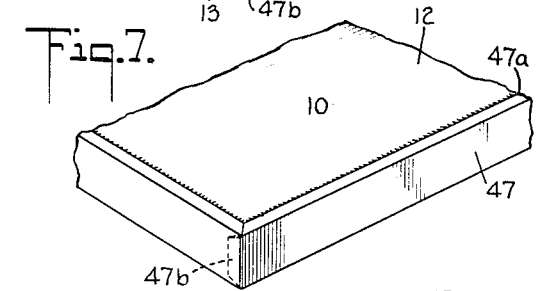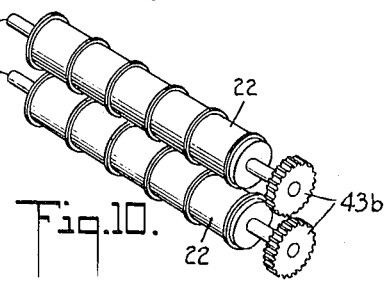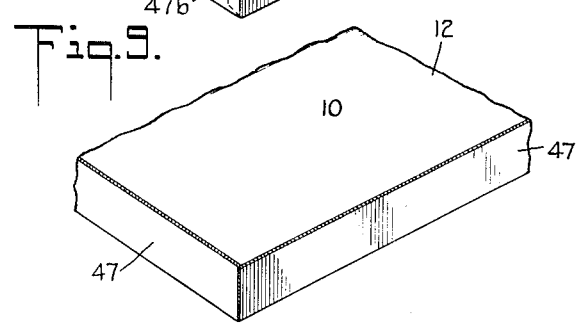
INVENTOR
BERNARD D. BEAMISH
ATTORNEYS

United States Patent Office 2,722,735
Patented Nov. 8, 1955

METHOD AND APPARATUS FOR FORMING A COMPOSITE STRUCTURAL MEMBER

Bernard D. Beamish, New Rochelle, N. Y., assignor to Honeycomb Company of America, Inc., a corporation of New York Application November 1, 1948, Serial No. 57,803

12 Claims. (Cl. 29—471.7)

The present invention relates to a method of forming a composite structural member and an apparatus for assembling such composite structural members in accordance with said method.

In accordance with the present invention composite structural members consisting of a reinforcing member in the form of a multi-cellular core with face plates secured to the opposite faces of the core are continuously formed and such members may be in the form of panels or other shape that are suitable for fabrication into flooring, walls, partitions, doors, aircraft structures or the like. A composite structural member produced in accordance with the present invention has smooth surfaces that are free from distortion or buckling and are suitable for the intended uses. The various objects and advantages of the invention will be apparent and best understood from the following description and the accompanying drawings in which:

Fig. 2 is a plan view of the apparatus illustrated in Fig. 1;

Fig. 3 is a section view of an arrangement for driving the apparatus illustrated in Figs. 1 and 2 but with certain of the feed rolls separated somewhat for the purposes of clarity;

Fig. 4 is an end view in section of a portion of the composite structural member being assembled;

Fig. 5 is a plan view of a portion of the composite structural member being assembled with parts thereof broken away;

Fig. 6 is a perspective view of a portion of a modified form of composite structure being assembled;

Fig. 7 is a perspective view of a portion of the composite structure illustrated in Fig. 6 as finally assembled;

Fig. 8 is a perspective view of a portion of another form of composite structure as partially assembled;

Fig. 9 is a perspective view of the composite structure illustrated in Fig. 8 as finally assembled; and Fig. 10 is a perspective view of the rolls for feeding the core.

Figure 1:
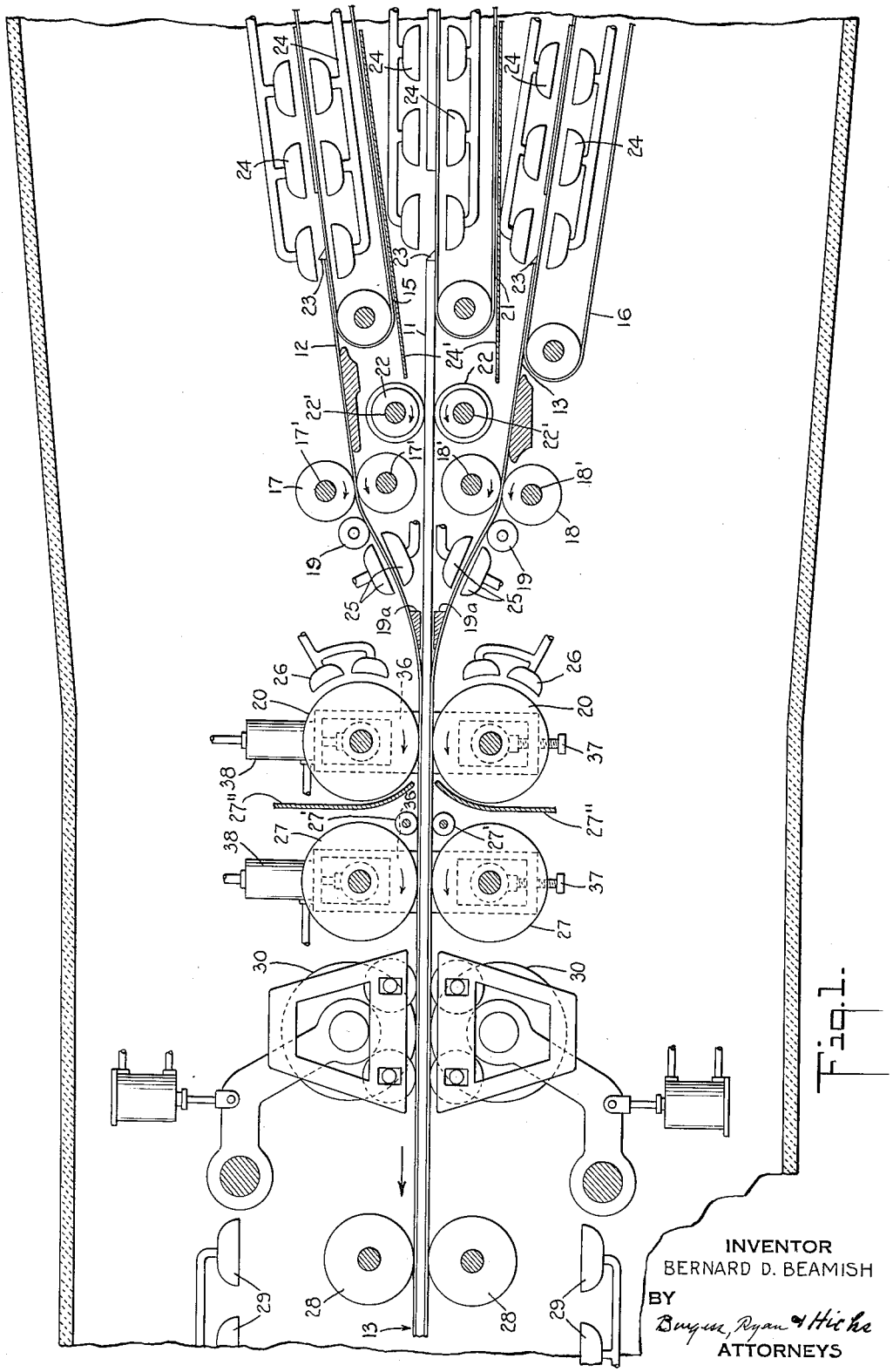
Fig. 1 is a side view in partial section of a portion of the apparatus for assembling a composite structural member in accordance with the invention.

Referring to the drawings in detail, the composite structure 10, as shown best in Figs. 4 and 5, consists of a reinforcing member or core 11 to opposite faces of which face plates 12 and 13 are secured.

The core 11 may be formed from strips of corrugated material 14 in the manner described and shown in my copending application, Serial No. 44,304, filed August 14, 1948, now abandoned. The edges of the corrugated strips forming the core 11 are vertical with respect to face plates 12 and 13 and thus the interior of composite structural member 10 is divided into a large number of individual cells. The resulting structure is strong but is of light weight and has excellent insulating properties. Such a structure is especially suitable for use in aircraft structure, fire doors, floors, etc.

The face plates 12 and 13 and the multi-cellular core 11 may be made from various materials such as tin plate, terne plate, sheet metal, sheet aluminum, plastic impregnated cloth or fibre or a combination thereof, and it will be understood that the present invention is not limited in respect to the particular material from which the elements of the composite structure may be formed. In the following description and the accompanying drawings, reference is made primarily to the assembly of a composite structure in which the reinforcing member or core and the face plates are made of sheet metal such as tin plate which may be bonded or joined by a fusible material such as solder. However, the composite structure may be formed from other materials, such as previously mentioned, that may be bonded or joined by appropriate bonding materials. For example, sheet steel may be bonded by brazing; aluminum may be bonded by a non-metallic adhesive, such as vinyl copolymer; or resin impregnated cloth may be bonded by synthetic adhesives or natural glues, in all of which methods of bonding some heat cycle to bring the bonding material to its critical or fusing temperature and then cooling is required.

When the core 11 is made of sheet metal such as tin plate, a bonding material in the form of a mixture of solder and rosin flux in the form of a mash may be applied to the surfaces of the core 11 so that the solder and rosin mixture will adhere to the edges of the corrugated strip material 14 forming the core 11 or the solder may be applied to the core in other suitable manners such as brushing or dipping.

If desired, tabs may be provided along the edges of the corrugated strips 14 forming the core 11 so as to provide larger areas on which the bonding material may be placed to be brought in contact with the face plates. In cases where a non-metallic adhesive is used, such adhesive may be applied to the core 11 in a viscous form so as to adhere to the edges of the corrugated strips. The application of solder and rosin to the core in this manner may, if desired, be supplemented by an application of solder or flux or a mixture thereof to the inner surfaces of the face plates 12 and 13. In the case of non-metallic adhesives the application to the core may also be supplemented by an application of the adhesive to the inner surfaces of the face plates if desired.

The forward section of the apparatus is essentially a travelling oven in which the core 11 and face plates 12 and 13 are continuously fed forward in aligned relation to each other on separate synchronized conveyors and are pre-heated to temperatures close to or above the melting point of the solder or the critical temperature of the adhesive, as the case may be, prior to their being brought together and joined. The core 11 which carries the solder or adhesive is heated to a point slightly below the melting point of the solder or critical temperature of the adhesive, while the face plates 12 and 13 may be heated to a temperature close to or somewhat above the melting point of the solder or critical temperature of the adhesive. After such preheating, the face plates 12 and 13 are brought into contact with the opposite sides or surfaces of the multi-cellular core 11 and the heat of the face plates, plus a further increment of heat, if necessary, that may be supplied at the point at which the elements are joined, is sufficient to fuse the solder or cause the adhesive to reach its critical temperature. Immediately after they are joined in this manner, the elements forming the structure are permitted to cool and upon such cooling the solder solidifies or the adhesive develops wet strength and secures the face plates 12 and 13 to the core 11.

One of the difficulties generally encountered in forming such structures is that when the core and face plates are brought into contact with each other, as in a press, they are at a temperature below the temperature necessary for bonding and a very substantial increment of heat must then be supplied externally to the face plates which may cause them to buckle due to their expansion under such heating, thus producing a rippled surface or resulting in the improper bonding of the face plates to the core. According to the present invention, however, all of the components of the structure are brought approximately to their maximum temperature prior to being joined and while they are free to expand independently of each other and will remain flat when they are joined together as only a relatively small component of heat need be supplied externally to the face plates at the point of juncture. The heating of the elements forming the composite structure and permitting them to expand independently of each other is particularly important where the linear surface areas of the elements being heated differ as is the case with the multi-cellular core 11 and the face plates 12 and 13. Thereafter, while the structure is held together, cooling commences and the forces are of contraction rather than expansion which tend to keep the face plates flat and to hold, rather than to break, the bonding.

In the illustrated embodiment of the apparatus strips of material that have been cut into appropriate lengths required for the face plates 12 and 13 are supported on conveyors 15 and 16, respectively, and are fed forward continuously by feed rolls 17 and 18 that are supported on shafts 17' and 18', and that are located on opposite sides of the multi-cellular core 11. Upon leaving the feed rolls 17 and 18, the strips forming the face plates 12 and 13 are directed downwardly and upwardly, respectively, by directing rolls 19 and are further directed by guides 19a so that the face plates 12 and 13 are in contact with the opposite faces of the core 11 when the composite structure is engaged by a set of pressure rolls 20.

The multi-cellular core 11 with the mixture of solder and rosin or other bonding agent, applied thereto is likewise supported on a conveyor 21 and is continuously fed forward by feed rolls 22 in alignment with the face plates 12 and 13. The feed rolls 22 are supported on shaft 22' and the surfaces of the feed rolls 22 may be relieved, as shown in Fig. 10, to provide a series of narrow discs that will bear upon and engage with the core 11 to feed it forward without disturbing the solder or other binding agent applied thereto. To insure proper feeding of the face plates 12 and 13 and the core 11 to their respective feed rolls, the conveyors 15, 16 and 21 may be provided with dogs 23 that engage with the rear ends of the face plates and the core. The dogs 23 cause the front ends of the face plates 12 and 13 and the core 11 to be presented in proper alignment with each other to the feed rolls 17, 18 and 22 which then grip the respective elements and feed them forward, drawing them away from the dogs 23 slightly. In this manner the dogs 23 will not interfere with the expansion of these elements. This arrangement permits slippage of the elements 12, 13 and 11 to take place relative to the feed belts 15, 16 and 21 under the influence of heating these elements and may be called a "slip-feed."

During the movement of the face plates 12 and 13 and the core 11 to the point where they are joined, these elements are preheated by suitable heaters 24 while being permitted to expand independently of each other and the face plates amy be further heated by supplementary heaters 25. The heaters 24 preheat the core 11 and the face plates 12 and 13 to a temperature just below the fusing or critical temperature of the solder or other bonding material which has been applied to the core and the supplementary heaters 25 may be used to heat the face plates 12 and 13 to a temperature above the fusing point of the solder or critical temperature of the bonding material. Where the core 11 and the face plates 12 and 13 are made of a sheet metal such as tin plate and the bonding material which is used for joining them is the usual lead-in alloy solder that has a fusing temperature of approximately 360° F., the core 11 may be preheated to a temperature of approximately 350° F. while the face plates 12 and 13 may be heated to a temperature of approximately 420° F.

Under such conditions, the principal expansion of the core 11, due to such heating, will have taken place and the face plates 12 and 13 will be fully expanded when they are brought into contact with each other at the pressure rolls 20. If desired, the heaters 24 for heating the various elements may be separated by baffles 24' so that desired differentials of temperature may be maintained.

When the face plates 12 and 13 are brought into contact with the core 11 and the structure thus formed is engaged by the pressure rolls 20, a heat balance is effected between the face plates and the core with the bonding material carried on the edges thereof that will raise the temperature of the bonding material to its fusing or critical temperature. In cases where the face plates are not pre-heated above the critical temperature of the bonding material or if additional heat is required for this purpose, the pressure rolls 20 may be suitably heated by heaters 26. In such case the rolls 20 act as soldering irons. It will be understood that the same principle will apply in the use of other bonding materials that fuse or develop wet adhesive strength at a different temperature from those described above for the lead-tin solder.

When using certain combinations of face plates and bonding agents, for instance, a combination of face plates of tin plate and a bonding agent of low tin content solder, which has a melting point higher than that of tin, it may be desirable in order to protect the coating of the face plates that they should not be pre-heated above the actual melting point of the bonding agent and the total further increment of heat necessary to force the solder may be supplied through the pressure rolls 20. In any case, however, it is intended that the principal expansion of all elements of the structure due to heating shall have taken place before they are joined together at the pressure rolls 20.

Following the pressure rolls 20 the composite structure that has been formed by bringing the face plates 12 and 13 into contact with the core 11 is gripped and fed forward by a set of feed or tension rolls 27 that engage with surfaces of the face plates 12 and 13 of the composite structure and are driven to draw the structure forward from the pressure rolls 20 under a controlled tension. The feed rolls 27 are located immediately after the pressure rolls 20 and the composite structure is permitted to cool to a point where the solder or other bonding material will set to secure the face plates 12 and 13 to the core 11 while the composite structure is held under tension between the rolls 27 and the pressure rolls 20. If desired, the feed rolls 27 may be cooled so as to extract further heat by conduction from the structure so as to bring the structure down to a temperature that will insure bonding. Also, if necessary, a further set of feed rolls, similar to the rolls 27 but not shown, may be located at a suitable distance behind the feed rolls 27 to hold the structure under tension for an additional period during cooling.

Between the pressure rolls 20 and the feed rolls 27 the structure 10 may be supported by rolls 27' that guide the entrance of a new panel into the feed rolls and support the end of a panel as it leaves the pressure rolls 20. In addition, baffles 27" that are located between the pressure rolls 20 and the feed rolls 27 may be provided to prevent the flow of heat from the pressure rolls 20 to the structure 10 that is held between the two sets of rolls.

The rolls 27, and the further rolls if necessary, are driven in synchronism with the pressure rolls 20 and thus hold the composite structure under a controlled draft or tension during its cooling between the point where the solder is fused and the point where the solder solidified and secures the face plates 12 and 13 to the core 11. The draft or tension under which the face plates 12 and 13 are held in this manner is sufficient to prevent their movement relative to the core 11 due to contraction upon cooling and any stresses that may be set up in the face plates 12 and 13 in this manner will be accommodated by the elasticity of the material from which they are formed. The resulting composite structure that emerges from the feed rolls 27 has smooth, flat surfaces that are substantially free of buckling or other surface deformation.

Upon leaving the feed rolls 27 the composite structure 10 passes between a set of guide rolls 28 and thereafter the rate at which the structure is permitted to cool may be controlled by temperature control devices 29. The temperature control devices 29 are located on opposite sides of the structure in the path of its movement. Also if it is desired in the case of structures formed of materials suitable for seam or spot welding, a series of suitable welding wheels 30 of conventional design may be positioned on opposite sides of the composite structure 10 after it leaves the feed rolls 27. The welding wheels 30 may be spaced across the structure 10 as shown in Fig. 2, so that by applying a welding current to the welding wheels 30 at timed intervals, a number of welds will be obtained securing the strips 12 and 13 to the core 11 in addition to their being secured by the fused solder.

In order to insure that the elements forming the composite structure will come together properly and be held under the controlled tension, without relative movement, it is desirable to drive the feed rolls 27 and the feed rolls 17, 18 and 22 feeding the face plates 12 and 13 and the core 11, respectively, in close synchronism with the pressure rolls 20. It is also desirable to arrange the pressure rolls 20, the feed rolls 27 and the feed rolls 22 so that they may be readily adjusted in order to accommodate different thicknesses of core and face plates.

A suitable arrangement for driving these rolls by gears from a common drive is illustrated in Fig. 3. In this arrangement each of the rolls of the pressure rolls 20 and the feed rolls 27 are driven from a drive shaft 31 by gearing indicated generally at 32 in which intermediate gears 33 engage with and drive gears 34 that are secured to each of the rolls. The rolls 20 and 27 are supported on short radial arms 35 that are pivoted on the shafts supporting the intermediate gears 33. This permits the gears 34 of the pressure rolls 20 and the feed rolls 27 to remain in engagement with their respective intermediate gears 33 when the arms 35 supporting the rolls 20 and 27 are moved about the centers of gears 33 so that the rolls 20 and 27 may be raised or lowered without disturbing or changing the gears 33 and 34 of the driving mechanism. The bearings of each set of rolls 20 and 27 are supported in a frame member 36 with the position of the lower roll of each set of rolls being adjustable in the frame by a screw mechanism 37 with the upper roll of each set of rolls being held downward by pressure supplied through the medium of air cylinders 38 or other suitable pressure devices.

The drive shaft 31 also drives a rearwardly extending shaft 39 that in turn drives a shaft 40. The shaft 40 drives the feed rolls 17 through gears indicated generally at 41 and the feed rolls 18 through gears indicated generally at 42. The feed rolls 22 are driven from the gears 42 by gears indicated generally at 43 in which intermediate gears 43a engage with and drive gears 43b secured to the feed rolls 22 (not shown in Fig. 3). The feed rolls 22 may also be mounted on radial arms 22a that are pivotally mounted for movement about the centers of the intermediate gears 43a in the manner previously described for the rolls 20 and 27 to permit adjustment of these rolls for different thicknesses of core material without disturbing or changing the gears.

All of this gearing is arranged so that the movement of the face plates 12 and 13 and the core 11 through the pressure rolls 20 and the feed rolls 27 will correspond and be at the same speed.

As shown best in Fig. 2, the face plates 12 and 13 and the core 11 may be held in alignment with each other as they move to the pressure rolls 20 by a series of rollers 44, 44a and 44b, respectively, and by a second series of rollers, 45, 45a and 45b, respectively, that are supported along the opposite edges of the face plates 12 and 13 and the core 11 so that the respective rolls engage with and hold the face plates and core in alignment. To accommodate lateral movement or slight variations in width of the face plates 12 and 13 and the core 11, the rollers 45, 45a and 45b engaging with one edge of the face plates and the core may be resiliently held in engagement with the edge of the face plates and the core by springs 46. The rollers 44, 44a and 44b and the rollers 45, 45a and 45b may, as indicated, have a different setting in respect to each other as will be the case when lower face plate 13 is wider than the composite structure to provide an overlapping edge 47 on the lower face plate 13 to be folded over to enclose or band the edges of the composite structure 10 as shown in the modified form of the structure illustrated in Figs. 6–9.

In the form of the composite structure 10 illustrated in Figs. 8 and 9, the overlapping portions 47 of the lower face plate 13 are folded over the core 11. These overlapping portions 47 may be sweated to the sides and end of the core 11 and also soldered to the face plate 12 where they are joined. In the form of the structure 10 illustrated in Figs. 6 and 7, the overlapping edge 47 is folded up and then flaps 47a and 47b are folded over and secured to the upper face plate 12 and the adjacent edge 47, respectively. These arrangements provide a completely enclosed structure where that is desired.

It will be understood that those skilled in the art may make various modifications and changes in the embodiments of the invention as shown and described herein without departing from the scope of the invention as defined by the claims appended hereto.

I claim:

1. The method of continuously forming a smooth surfaced, composite structural member consisting of a face plate and a cellular core wherein opposing portions of the elements of said structure have different linear surface areas and are secured together by a bonding material that requires heating to a critical temperature and cooling in order to effect a bond between the elements of the structure, the steps which include feeding the elements of a composite structure forward in aligned relation to each other, preheating said elements as they are being fed forward to a temperature close to but below the critical temperature of a bonding material, said elements being free to expand independently of each other during such preheating, then bringing said elements into contact with each other under pressure with the bonding material interposed therebetween, then supplying a final increment of heat to said elements, said final increment of heat being sufficient to raise the temperature of the bonding material to its critical temperature and then cooling the composite structure thus formed to a temperature below the critical temperature of the bonding material.

2. The method of continuously forming a smooth surfaced, composite structural member wherein opposing portions of the elements of said structure have different linear surface characteristics and are secured together by a bonding material that requires heating to a critical temperature and cooling in order to effect a bond between said elements, the steps which include feeding the elements of a composite structure forward in aligned relation to each other with a bonding material carried by at least one of said elements, preheating said elements to a temperature close to but below the critical temperature of the bonding material as they are fed forward with said elements being free to expand independently of each other during such preheating, then bringing said elements into contact with each other under pressure and supplying a final increment of heat to said elements, said final increment of heat being sufficient to raise the temperature of the bonding material to its critical temperature and then cooling the composite structure thus formed to a temperature below the critical temperature of the bonding material while maintaining it under a controlled tension sufficient to prevent movement of the elements relative to each other during such cooling.

3. The method of forming a composite structural member as defined in claim 2 wherein the elements of the composite structure are of sheet metal and are secured together by a fusible material, said elements being preheated to a temperature below the fusing point of the fusible material as they are fed forward and finally being heated to a temperature above the fusing point of the fusible material upon being brought into contact with each other.

4. The method of forming a composite structural member, the steps as defined in claim 2 including the step of welding the elements of the composite structure together immediately following said cooling.

5. In the method of forming a composite structural member wherein face plates are secured to opposite sides of a reinforcing core member formed from vertically extending corrugated members by a bonding material that requires heating to a critical temperature and cooling in order to effect a bond between the face plates and core, the steps which include continuously feeding the face plates and core in the same direction while preheating them to a temperature approaching but short of the critical temperature of a bonding material carried by the core and with the face plates and core being free to expand independently of each other during such preheating, then bringing the moving face plates into contact with the moving core on opposite sides thereof under pressure, then supplying a final increment of heat to the face plates to raise the temperature of the bonding material carried by the core above its critical temperature, and then cooling the structure thus formed while movement thereof continues to a temperature below the critical temperature of the bonding material while maintaining said structure under a controlled tension sufficient to prevent movement of the face plates relative to the core.

6. The method of continuously forming a smooth surfaced, composite structural member wherein opposing portions of the elements of said structure have different linear surface areas and are secured together by a bonding material that requires heating to a critical temperature and cooling in order to effect a bond between the elements of the structure, the steps which include feeding the elements of a composite structure forward in aligned relation to each other, preheating all of said elements as they are being fed forward to a temperature approaching the critical temperature of a bonding material and heating one of the elements to a temperature above the critical temperature of the bonding material, said elements being permitted to expand independently of each other during such preheating, then bringing said elements into contact with each other under pressure with the bonding material interposed therebetween, then supplying a final increment of heat to said elements, said final increment of heat being partially supplied by the element heated to a temperature above the critical temperature of the bonding material and being sufficient to raise the temperature of the bonding material to its critical temperature and then cooling the composite structure thus formed to a temperature below the critical temperature of the bonding material.

7. The method of continuously forming a smooth surfaced, composite structural member wherein opposing portions of the elements of said structure have different linear surface characteristics and are secured together by a bonding material that requires heating to a critical temperature and cooling in order to effect a bond between said elements, the steps which include feeding the elements of a composite structure forward in aligned relation to each other with a bonding material carried by at least one of said elements, preheating all of said elements to a temperature approaching the critical temperature of the bonding material and heating one of the elements to a temperature above the critical temperature of the bonding material as the elements are fed forward, said elements being permitted to expand independently of each other during such preheating, then bringing said elements into contact with each member under pressure and supplying a final increment of heat to said elements, said final increment of heat being supplied in part by the element heated above the critical temperature of the bonding material and being sufficient to raise the temperature of the bonding material to its critical temperature and then cooling the composite structure thus formed to a temperature below the critical temperature of the bonding material while maintaining it under a controlled tension sufficient to prevent movement of the elements relative to each other during such cooling.

8. In the method of forming a composite structural member wherein face plates are secured to opposite sides of a reinforcing core member formed from vertically extending corrugated members by a bonding material that requires heating to a critical temperature and cooling in order to effect a bond between the face plates and core, the steps which include continuously feeding the face plates and core in the same direction while preheating the core to a temperature approaching but short of the critical temperature of a bonding material carried by the core and the face plates to a temperature exceeding the critical temperature of the bonding material, the face plates and core being free to expand independently of each other during said heating, then bringing the moving face plates into contact with the moving core on the opposite sides thereof under pressure, then supplying a final increment of heat to the face plates to raise the temperature of the bonding material carried by the core above its critical temperature, and then cooling the structure thus formed while movement thereof continues to a temperature below the critical temperature of the bonding material while maintaining said structure under a controlled tension sufficient to prevent movement of the face plates relative to the core.

9. In an apparatus for joining elements of a composite structural member together by a bonding material of the type that is heated to a critical temperature and then cooled to form a bond and where the linear expansion of the elements of the structural member differ from each other under the influence of such heating and cooling, the combination which includes heating means for preheating elements of a structural member comprising of a face plate and a core member to a temperature approaching the critical temperature of a bonding material, feed means for continuously feeding the face plate and the core member independently of each other during said preheating, said feed means permitting linear expansion of the face plate and the core member during preheating, means engaging with the face plate and core member for bringing the face plate into contact with the core member under pressure following the preheating and expansion thereof, heating means for supplying a final increment of heat to at least one of said elements, as the elements are brought into contact, said increment of heat being sufficient to raise the temperature of the bonding material to a temperature above its critical temperature, and means engaging with and holding the face plate and the core member against movement relative to each other after they have been brought into contact and while the bonding material is heated to a temperature above its critical temperature.

10. In an apparatus for joining elements of a composite structural member together, the combination as defined in claim 9 wherein the means for holding the face plate and the core member against movement relative to each other after they have been brought into contact and while the bonding material is heated to a temperature above its critical temperature includes a pair of driven rolls which engage with the face plate and the core member on opposite sides thereof, said rolls being spaced from the means for bringing the face plate into contact with the core member by a distance that permits the bonding material to cool to a temperature below its critical temperature.

11. In an apparatus for joining elements forming a composite structural member together, the combination as defined in claim 9 wherein, the means for feeding the face plate and core member independently during the preheating thereof includes belts engaging with and supporting the face plate and the core member with the rear ends thereof free to expand and feed rolls engaging with the face plate and the core member at a point following said belts.

12. In an apparatus for securing face plates on opposite sides of a cellular core by means of a bonding material of the type that is heated to a critical temperature and then cooled to form a bond, the combination which includes means for preheating the face plates and the core, means for continuously moving the face plates and the core relative to the preheating means and in aligned relation to each other, said feed means permitting the face plates and the core to expand rearwardly independently of each other during the preheating thereof, a set of pressure rolls engaging with and bringing the face plates into contact with the core after the face plates and the core have been expanded by said preheating, means for supplying an increment of heat to at least one of said elements sufficient to raise the temperature of the bonding material to its critical temperature when said elements are brought into contact, and a pair of rolls engaging with and holding the face plates and core member against movement relative to each other after they have been brought into contact and until the bonding material has cooled to a temperature below its critical temperature.

References Cited in the file of this patent

UNITED STATES PATENTS

| Number | Name | Date |
|---|---|---|
| 891,428 | Latus | June 23, 1908 |
| 995,589 | Eichmann | June 20, 1911 |
| 1,541,641 | Guay | June 9, 1925 |
| 1,687,605 | Bundy | Oct. 16, 1928 |
| 1,764,271 | Leonard | June 17, 1930 |
| 1,949,420 | Johnson | Mar. 6, 1934 |
| 1,956,464 | Palm | Apr. 24, 1934 |
| 1,983,930 | Carlsen | Dec. 11, 1934 |
| 1,996,951 | Clark et al. | Apr. 9, 1935 |
| 2,061,850 | Roberts | Nov. 24, 1936 |
| 2,073,334 | Coffman | Mar. 9, 1937 |
| 2,154,143 | Whelan | Apr. 11, 1939 |
| 2,210,338 | Quarnstrom | Aug. 6, 1940 |
| 2,255,397 | Sidebotham | Sept. 9, 1941 |
| 2,275,262 | Malhiot | Mar. 3, 1942 |
| 2,344,488 | Bowling | Mar. 21, 1944 |
| 2,414,511 | Dyar | Jan. 21, 1947 |
| 2,423,870 | Blessing | July 15, 1947 |
| 2,510,727 | Sussenback | June 6, 1950 |
| 2,545,370 | Mittelmann | Mar. 13, 1951 |
| 2,558,093 | Kinney | June 26, 1951 |
| 2,580,502 | Anderson | Jan. 1, 1952 |
| 2,627,010 | Matteson et al. | Jan. 27, 1953 |